United States Patent [19]

Hooper et al.

[11] Patent Number: 5,819,282
[45] Date of Patent: Oct. 6, 1998

[54] DATABASE GENERATOR

[75] Inventors: Donald F. Hooper, Shrewsbury; Jay S. Newcomb, Holliston, both of Mass.

[73] Assignee: Digital Equipment Corporation, Maynard, Mass.

[21] Appl. No.: 682,220

[22] Filed: Jul. 17, 1996

Related U.S. Application Data

[63] Continuation of Ser. No. 196,044, Feb. 14, 1994, abandoned.

[51] Int. Cl.⁶ ................................................... G06F 17/30
[52] U.S. Cl. ............................................ 707/103; 707/100
[58] Field of Search ............................ 395/600; 707/103, 707/100

[56] References Cited

U.S. PATENT DOCUMENTS

| | | | |
|---|---|---|---|
| 4,864,497 | 9/1989 | Lowry et al. | 364/300 |
| 5,115,504 | 5/1992 | Belove et al. | 707/100 |
| 5,253,361 | 10/1993 | Thurman et al. | 707/3 |
| 5,295,256 | 3/1994 | Bapat | 395/500 |
| 5,402,524 | 3/1995 | Bauman et al. | 395/50 |
| 5,504,885 | 4/1996 | Alashqur | 395/600 |
| 5,548,749 | 8/1996 | Kroenke et al. | 395/600 |

FOREIGN PATENT DOCUMENTS

| | | | |
|---|---|---|---|
| 248287A2 | 9/1987 | European Pat. Off. | 9/34 |
| 425412A3 | 2/1991 | European Pat. Off. | 15/40 |
| 637806A2 | 8/1995 | European Pat. Off. | 17/30 |

OTHER PUBLICATIONS

Won Kim et al., "Composite Object Support in an Object–Oriented Database System", Oct. 1987, pp. 118–125.
Daniel A. Keim et al., "Integration of Relational Databases in a Multidatabase System based on Schema Enrichment", IEEE, pp. 96–104, 1993.
Victor M. Markowitz and Arie Shoshani, "Object Queries Over Relational Databases Language, Implementation, and Applications", IEEE, pp. 71–80, No date.

*Primary Examiner*—Thomas G. Black
*Assistant Examiner*—Cheryl R. Lewis
*Attorney, Agent, or Firm*—Dirk Brinkman; A. Sidney Johnston

[57] ABSTRACT

A data base is created by storing a plurality of data objects in a memory. Each data object has attributes including a key value and a data value. The data objects are partitioned into a plurality of classes, each class having one or more members, each member including the same attributes of the data objects. An access method is defined for at least one member of a specific class to access the data objects of the specific class by key values. For another member of the specific class, an access method to access the data objects of a related class is defined. A specific data value of a specific data object is compared with the key values of the data objects of the related class, and if the specific data value is equal to the key value of a related data object a memory address of the related data object is associated with the specific data value.

46 Claims, 9 Drawing Sheets

SPREAD_SHEET

COMMA_SEPARATED_VALUE FILE

EXPANDED SPREAD_SHEET

| | 210 | 211 | 212 | 213 |
|---|---|---|---|---|
| 201 | C | EMPLOYEES | | |
| 202 | M | ID | NAME | LOCATION |
| 203 | A | LPKEY | HSKEY | |
| 204 | T | INTEGER | STRING | STRING |
| 205 | S | CITY_TAX | | |
| 221 | D | ID1 | NAME 1 | LOCATION 1 |
| 222 | D | ID2 | NAME 2 | LOCATION 2 |
| 223 | D | ID3 | NAME 3 | LOCATION 3 |

EXPANDED CSV FILE

```
301 → C, EMPLOYEES
302 → M, ID, NAME, LOCATION
303 → A, LPKEY
304 → T, INTEGER, STRING, STRING
305 → S, CITY-TAX, LOCATION = NEW YORK & JOB = WORKER
321 → D, ID1, NAME 1, LOCATION 1.
322 → D, ID2, NAME 2, LOCATION 2.
323 → D, ID3, NAME 3, LOCATION 3.
```

ACCESSING METHODS

| ACCESS METHOD | EXTERNAL | INTERNAL | |
|---|---|---|---|
| LPKEY | VALUE | LINEAR LIST | 71 |
| HPKEY | VALUE | HASHING TABLE | 72 |
| BPKEY | VALUE | BINARY_TREE | 73 |
| LSKEY | VALUE | LINEAR LIST | 74 |
| HSKEY | VALUE | HASHING TABLE | 75 |
| BSKEY | VALUE | BINARY_TREE | 76 |
| POINTER | PRIMARY KEY | ARRAY OF MEMORY ADDRESS | 77 |
| ARRAY | QUERY EXPRESSION | ARRAY OF MEMORY ADDRESS | 78 |
| LIST | QUERY EXPRESSION | ARRAY OF MEMORY ADDRESS | 79 |

DATABASE GENERATOR

This application is a continuation of application Ser. No. 08/196,044, filed Feb. 14, 1994 now abandoned.

FIELD OF THE INVENTION

The present invention relates generally to computer systems, and more particularly to databases used with computer systems.

BACKGROUND OF THE INVENTION

A number of different database styles can be used with computer applications. Each style of database including, perhaps, features particularly suited for a specific application. Well-known databases include relational, object-oriented, and networked databases.

Relational databases have gained popularity because of their ease-of-use and simple structure. Consider the ubiquitous spread-sheet. In spread-sheet applications, the relationships of the data are maintained in one or more tables having rows and columns. The rows maintain instances of data, and the columns group data having common characteristics or attributes.

Typically, the data of the spread-sheet are stored in, what is known as, a comma-separated-value (CSV) file. In a CSV file, the columnar values are delimited by commas, or some other equivalent delimiter such as a tab. The lines of the CSV file correspond to the rows of the table. Each line of the CSV file is delimited by a suitable end-of-line character, for example, a carriage return. CSV files are easy to create, maintain, and transport from one application to another. Relational databases using either spread-sheets or CSV files can be created without having in-depth knowledge of computer programming. Hence their popularity.

In addition, a large number of query languages, including natural language queries, have been developed for accessing the data of relational databases. For example, a Structured Query Language (SQL) retrieves data from relational databases according to predetermined relationships by using logical (Boolean) selection criteria.

However, applications accessing large relational databases consume a substantial amount of time scanning the relationship tables for particular instances of data having specified attributes. This degrades performance and interferes with the interactive use of relational databases.

Recently, object-oriented programming has become a popular technique for developing applications. In an application developed by object-oriented programming, the basic unit of organization is an object. An object includes data and functions for processing the data. In other words, examining the object not only reveals the data, but also the methods that should be used to process the data.

This encapsulation arrangement protects the data from corruption by other objects and, in addition, hides low-level implementation detail. As an advantage, databases created and managed with object-oriented programming techniques tend to be versatile and robust. However, object-oriented programming, for the most part, demands a higher level of programming skill than using spread-sheet tools. For the tyro, object-oriented programming is a less likely implementation choice.

Applications which require very fast access to data often use a networked type database. In a networked database the frequently accessed data are directly accessible by in-memory pointers. Thus, unlike relational databases where the relationship tables have to be searched to find particular data, in networked databases, the in-memory pointers lead directly to the data to decrease access latencies.

These, as well as many other styled databases, have followed distinct evolutionary paths, and are essentially incompatible with each other. Data of one style of database must usually be extracted, translated, and reformatted piecemeal before it can be stored in another style of database. Data of relational databases can not readily be accessed by object-oriented programs. Similarly, applications designed with object-oriented programs have problems digesting unencapsulated data of relational databases. Once a database user selects a particular style of database for use with an application, converting the database to another style is a time consuming and costly process. A process which is likely to introduce data inconsistencies.

Therefore, there is a need for techniques which do not incur substantial translation costs while converting from one style of database to another. The techniques should allow the creation of complex databases with simple-to-use tools. The access time to frequently used data should be minimized. Data which satisfy predetermined selection criteria or queries should be easy to identify and access. Furthermore, object-oriented manipulation of the data should be possible. It is to these ends that the invention is directed.

SUMMARY OF THE INVENTION

The present invention integrates the characteristics and strengths of known databases into a polymorphic database or hypermedia. The hypermedia has the ease of entry and query of relational database, the performance of networked databases, and the portability and robustness of object-oriented databases.

Using the structures and processes according to the invention, development time for applications can be reduced, and data from prior incompatible databases can be made accessible.

The database is created by storing a plurality of data objects in a memory of a computer system. Each data object has attributes including a key value and a data value. The key value attribute is for accessing the data objects by either a primary or secondary key.

The data objects are partitioned into a plurality of classes. Each class is expressed in a relational table having rows and columns. The rows correspond to the instances of data objects, and the columns or members correspond to data values having the same attribute.

At least one member of a specific class is defined as an access method to access the data objects of the specific class by key values. Another member of the specific class is defined as an access method to access the data objects of a related class.

A specific data value of a specific data object is compared with the key values of the data objects of the related class. This comparison can be done when the data objects are stored in memory, or whenever any of the data objects are modified or otherwise processed in a way which effects where and how the data objects are stored in the memory.

If the specific data value is equal to the key value of a related data object of the related class, a memory address of the related data object is associated with the specific data value to enable direct and fast access to the related data object while accessing the specific data object.

According to the preferred embodiment of the invention, the classes, including the data objects and the class definitions are initially stored in a relational table having columns and rows. The relational tables are pre-compiled, into source code in the C++ language. The source code can be compiled into object code, and the object code can be linked to create an executable file. Loading and executing the executable file essentially creates the database.

BRIEF DESCRIPTION OF THE DRAWINGS

FIG. 5 is a version of the spread-sheet of FIG. 3 expanded to include processing information;

FIG. 6 is a block diagram of a comma-separated-value file corresponding to the expanded spread-sheet of FIG. 5;

FIG. 8 is a table listing accessing methods for the database of FIG. 2;

DETAILED DESCRIPTION OF A PREFERRED EMBODIMENT

Figure 1:
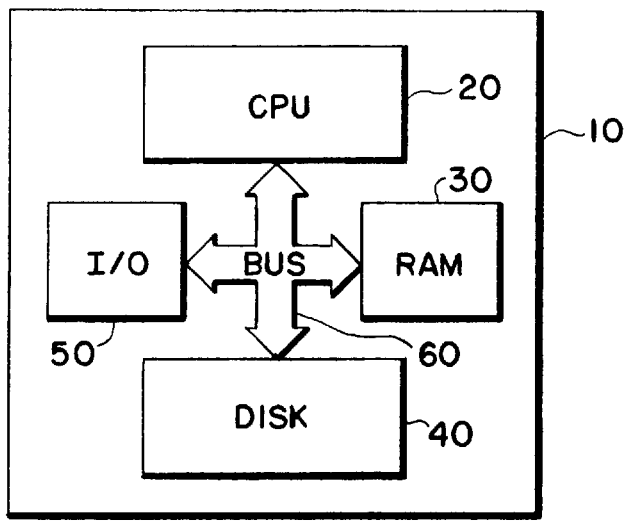
FIG. 1 is a block diagram of a computer system which can use the invention.

FIG. 1 shows a computer system 10 comprising structures and processes in accordance with the principles of the invention. The computer system 10 is of the type which can include a central processor unit (CPU) 20, a fast local memory (RAM) 30, a slower bulk memory (DISK) 40, and an I/O sub-system (I/O) 50. The CPU 20, RAM 30, DISK 40, and I/O 50 are connected to each other by a data communications bus (BUS) 60. During operation of the computer system 10, data are transferred between the RAM 30, the DISK 40, and the I/O 50, via the BUS 60, for processing by the CPU 20.

To facilitate access, the data are organized into a data structure commonly known as a database. Access generally meaning both the writing or storing of the data, and the reading or retrieving of the data. The database can be stored in the RAM 30 or the DISK 40. Usually, inactive portions of the database are stored in the DISK 40, and active portions, that are data being processed by the CPU 20, are stored in the RAM 30. The data for the database can also be accessed via the I/O 50.

Historically, a number of different database styles have evolved. However, most known databases are incompatible with each other. Applications developed for one style of database may have difficulties accessing the data of another style of database. It is a goal of the present invention to alleviate these problems.

The data structures and processes which implement the invention provide a technique for implementing a sophisticated polymorphic database with simple-to-use tools, for example, a spread-sheet application. Furthermore, the inventive structures and processes provide an interface between relational databases and databases developed with object-oriented programming techniques.

Figure 2:
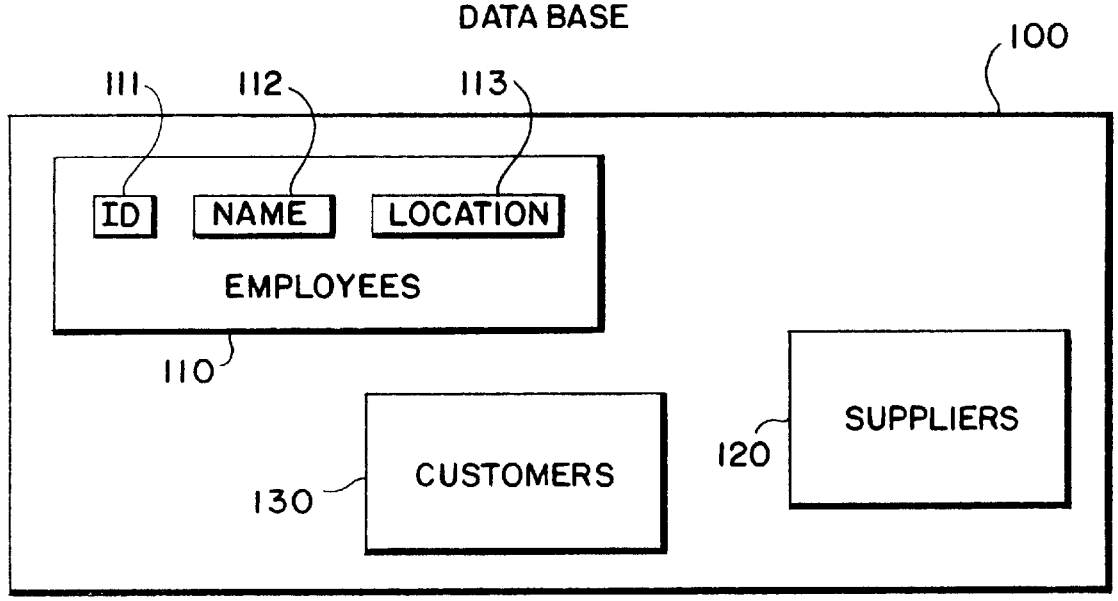
FIG. 2 is a block diagram of data to be organized into a database according to the principles of the invention.

FIG. 2 shows an example corporate database 100 to be implemented according to the principles of the invention. The corporate database 100 can be partitioned into sub-sets of data such as EMPLOYEES 110, SUPPLIERS 120, and CUSTOMERS 130. The sub-set of data EMPLOYEES 110 can include data representing employee identifications, names, and locations, for example, ID 111, NAME 112, and LOCATION 113.

Figure 3:
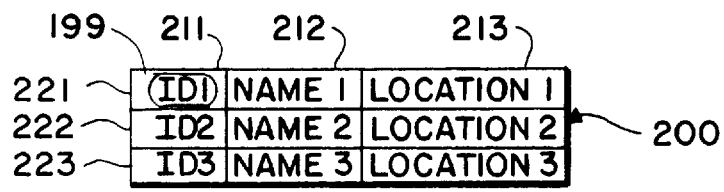
FIG. 3 is a block diagram of a spread-sheet including a subset of the data of FIG. 2.
Figure 4:
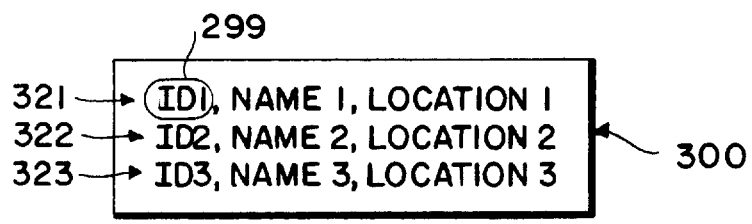
FIG. 4 is a block diagram of a comma-separated-value file corresponding to the spread-sheet of FIG. 3.

FIG. 3 shows how the data related to EMPLOYEES 110 can be organized into a relational form, for instance, a spread-sheet 200. The spread-sheet 200 can be created by any of the well-known spread-sheet applications. For ease of transportability, the spread-sheet 200 can be maintained as a comma-separated-value (CSV) file 300, as shown in FIG. 4. Alternatively, the CSV file 300 could be directly created with a word-processor application. The CSV file 300 can be permanently stored, for example, in the DISK 40.

The spread-sheet 200 includes cells generally indicated by reference numeral 199. The cells 199 are arranged into columns 211–213, and rows 221–223. The columns 211–213 organize the data according to a common attribute, and each of the rows 221–223 organizes specific instances of data, for example data representing information about individual employees.

The cells 199 of attribute column 211 organize data uniquely identifying employees, e.g., identification numbers ID1, ID2, and, ID3. The cells 199 of column 212 organize employee names, such as NAME1 and NAME2. The cells 199 of the column 213 are used for organizing the location of employees, e.g., LOCATION1.

In FIG. 4, the CSV file 300 includes lines 321–323 corresponding to the rows 221–223 of FIG. 3. The comma-separated-values, generally indicated by reference numeral 299, correspond to the cells 199 of FIG. 3.

Although this spread-sheet structure is simple to understand and easy to create, it lacks any type of information which would guide a sophisticated application how to manipulate the data. Therefore, in accordance with the principles of the invention, the spread-sheet 200, while still in relation form, is expanded to include information describing methods and structures which may be used to process the data. Processing including, but not limited to, locating, reading, modifying, and writing the data.

FIG. 5 shows an expanded spread-sheet 309. Whether a particular row of the expanded spread-sheet 209 is categorized as containing data or processing information is indicated in a prepended column, for example, column 210.

The rows 221–223 organizing data are categorized by the letter D in the prepended column 210, (D-rows). The rows 201–205 including processing information are categorized by the letters C, M, A, T, and S in the prepended column 210 (C-, M-, A-, T-, and S-rows, respectively). Briefly, FIG. 6 shows an expanded CSV file 309 corresponding to the expanded spread-sheet 209.

The description of FIG. 5 now continues. If the first column of a row contains the letter C, for example row 201, the following column is used to store the name of the partitioned sub-set of data included in the spread-sheet, for example, the name EMPLOYEES.

Each partitioned, organized, and expanded sub-set of data, e.i., EMPLOYEES 110, SUPPLIERS 120, and CUSTOMERS 130, will henceforth be referred to as a class. And the corresponding CSV file will be referenced as CLASS.CSV, where CLASS can be substitute by the name of the class, e.g., EMPLOYEES, CUSTOMERS, and SUPPLIERS. The class names can be used for referencing and locating data and processes of the class.

If the row is distinguished with the letter M in the first column, the subsequent columns are used for storing the attribute names of the corresponding columns, hereinafter members. A class can have one or more members, and each member has an associated member name. In the example database 100, the members of class EMPLOYEES are ID, NAME, and LOCATION. The member names are used for referencing and locating data and processing information to the particular members of the class.

The letter A in the first cell of a row is used to categorize rows storing information relating to accessing methods to be used for member data. Each subsequent column of an A-row, for example, columns 211–213 of row 203, identifies a specific method described in greater detail with reference to FIG. 8.

The letter T is used to distinguish rows storing information describing the type of member data. Each subsequent column of the T-row corresponding to an associated member. Types of member data can include INTEGER, and STRING. For member data typed as INTEGER, the data is, for example, required to be in integer form, and the internal or primitive structures for storing the integer values, can be, for example, a fixed number of bits of the RAM 30 of FIG. 2. Member data typed as STRING can include letters or numbers. Internally, character codes are stored in the RAM 30 as, for example, bytes.

The number of possible data types is only limited by the means available to store and process the typed data. Some other possible data types could include, for example, FLOATING, REAL, LONG-STRING, CANONICAL, HEXADECIMAL, SIGNED-NUMBER, and so forth. The member ID has data types as INTEGER, and the members NAME and LOCATION have data typed as STRING.

Alternatively, the data type of a member can be the name of a class storing data related to the thus typed member. By typing a member in this manner, various classes storing related data can be associated with one and another. This association of classes is further described with reference to FIG. 8 and accessing methods.

In addition to the pre-defined data types, INTEGER, STRING, and so forth, the preferred embodiment of the invention admits additional user defined data types. The user defined data types are organized in spread-sheets or equivalent CSV files, the later by convention named, USER.CSV.

Figure 7:
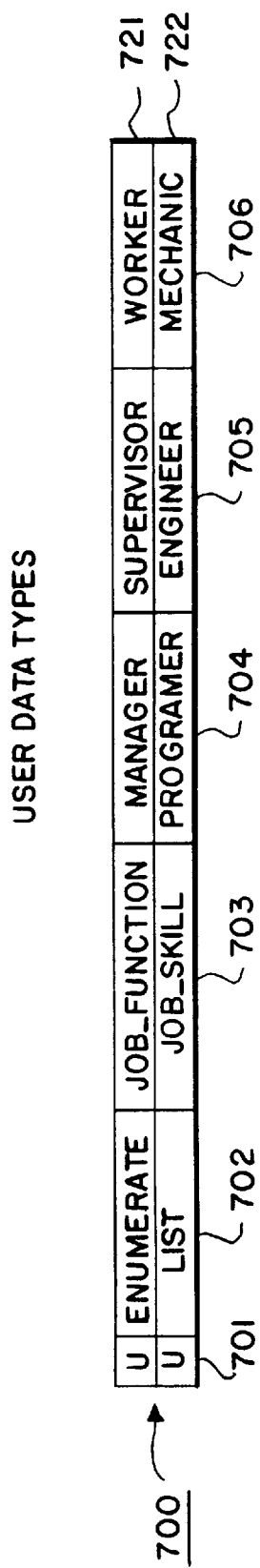
FIG. 7 is a block diagram of user data types.

A spread-sheet form of an example USER.CSV is shown in FIG. 7. Each of the rows 721–724 of the spread-sheet 400 defines a user data type. The first column 701 has the letter U. User data types can be, for example, ENUMERATE and LIST. The general form of a particular user data type is indicated in the second column 702 of the rows 721–724. The name of the user data type is indicated the third column 703.

The user data type ENUMERATE can be used to enumerate predetermined values which a specific member can assume. Only one of the enumerated values can be selected. The predetermined exclusive values are enumerate in the subsequent columns 704–706. For example, row 721 defines the user data type ENUMERATE which has a name JOB-FUNCTION. Any member typed as JOB-FUNCTION can, for example, only have one of the enumerated values MANAGER, SUPERVISOR, or WORKER.

The user data type LIST can be used to list multiple values which a specific member can assume. Any of the listed values can be selected. The predetermined inclusive values are listed in the subsequent columns. For example, row 722 defines a user data type LIST having a name JOB-SKILL. Any member typed as JOB-SKILL can, for example, have any of the listed values PROGRAMMER, ENGINEER, and MECHANIC. It should be apparent that other similar user data types can be defined in a USER.CSV.

Now continuing with reference to FIGS. 5, the letter S is used to categorize rows which include names of queries. While accessing class data, queries can be used to search and select only those member data for which the logical value of the query is true. The query can be in a form similar to a query language, for example SQL. The short-hand name of the query can be indicated in the second column, and the named query can be formulated in the third column. For example, a query could be expressed in an S-row as: S, CITY-TAX, LOCATION=NEW YORK & JOB=WORKER. Referencing a query by name relieves the database implementor from the tedious task of retyping long queries wherever the query is used.

The letter D simply categorizes the D-rows. Each subsequent column organizing data related to the associated member, see rows 221–223. A D-row can be considered an expression of a "data object." Minimally, a data object includes a "key" value and "data" values. The key value, which must be unique for a particular object of a class, distinguishes the object from other instances of data objects in the class.

Since each row of the class is categorized by the prepended column, the particular order of the rows is of minimal concern. For example, from a structural perspective, the method rows may just as well follow the data rows. Procedurally, however, during database transformation or creation, spread-sheets and CSV files can be manipulated more efficiently if the order of the rows is generally maintained as described for, and as shown in FIG. 5.

It should be appreciated, that a database structure for storing data can be created without actually storing data in the database. For example, the database 100 can initially be defined by CLASS.CSV files which do not include D-rows. In this case, the C-, M-, A, T-, and S-rows define skeletal structures and processes for data objects to be supplied at a later time by the user of the database. Data objects can subsequently be loaded into the database 100 with CLASS.CSV files which include, for example, only D-rows.

The accessing methods which can be used with A-row 203 are now described with reference to FIG. 8. The accessing methods, in part, define how the members are to be directly accessed and located. Direct access meaning that data objects are located by means of access keys.

Furthermore, the accessing method can also be used to access related data objects. Relational access meaning that direct access to the object of a class by key also permits substantially concurrent access to other objects, perhaps in other classes, related to the objects directly accessed. As will be described herein, access to related objects is facilitated by dynamically maintaining memory addresses of the related objects with the directly accessed objects.

Possible accessing methods, in the preferred embodiment of the invention, can use primary keys, secondary keys, pointers, arrays, and lists.

One member of a class must be directly accessible by a primary key. The value of a primary key, the "key value" can be in the form of any data type having a singular value. For example, in FIG. 5, the member ID of column 211, defines the primary key for uniquely accessing the instances of data objects in the class EMPLOYEES. Structures which implement primary keys can include linear or linked lists, hashing tables, and B-trees indices.

Secondary keys provide alternative access paths to data. A class can have multiple members typed as secondary keys. Secondary keys, like primary keys, can also be maintained in lists, hashing tables or B-tree indices. Secondary keys may take longer to create, however, they generally provide faster access to data objects than primary keys.

Pointers, arrays, and lists also provide access paths to data objects related to the directly accessible objects. Although the structures supporting pointers, arrays, and lists are initially more expensive to construct, once in place they enable fast access to data objects related to each other, even if the related objects are stored in different classes.

Externally, a pointer can be referenced by the name of the class where the related data objects are to found. The name is defined on a T-row as described above. The processes implemented according to the principles of the invention convert the external class name, to a memory address, for example, an address of the RAM 30 of FIG. 1 where the class is stored. Furthermore, during operation, the current memory addresses of all objects related to a specific object are maintained with the specific object. Thus, if the specific object is accessed, for example, directly by a primary key, the memory addresses of related objects are immediately revealed. Any changes in the memory addresses of related objects are reflected in the specific object as they occur while the objects are being manipulated.

Arrays are externally expressed as queries. Internally, during the logical evaluation of a query, an array of memory addresses is created. The array of memory addresses referencing all objects which satisfy the condition of the query. Whenever a data object is added to the database, a determination is made whether the data object satisfies some search criterium. Satisfying the query meaning that a logical evaluation of the object according to the query predicates produces a true condition. Likewise, if a data object is modified, a determination is made whether the memory address should be added to an array of memory addresses, or deleted if object no longer satisfies the query.

Similarly, data objects to be accessed as a list are also externally expressed as a query. Internally, a list of memory addresses is created to rapidly locate the qualified data objects.

FIG. 8, in tabular form, summarizes the accessing methods according to the preferred embodiment of the invention. The rows 71–79 of column 70 defined auxiliary types LPKEY, HPKEY, BPKEY, HSKEY, BSKEY, POINTER, ARRAY, and LIST, respectively. These types correspond to linear, hashed, and B-tree primary and secondary keys, and to pointers, arrays, and lists as described above. A second and third column 80 and 90, in summary form, indicates the external and internal form of the values.

Figure 9:
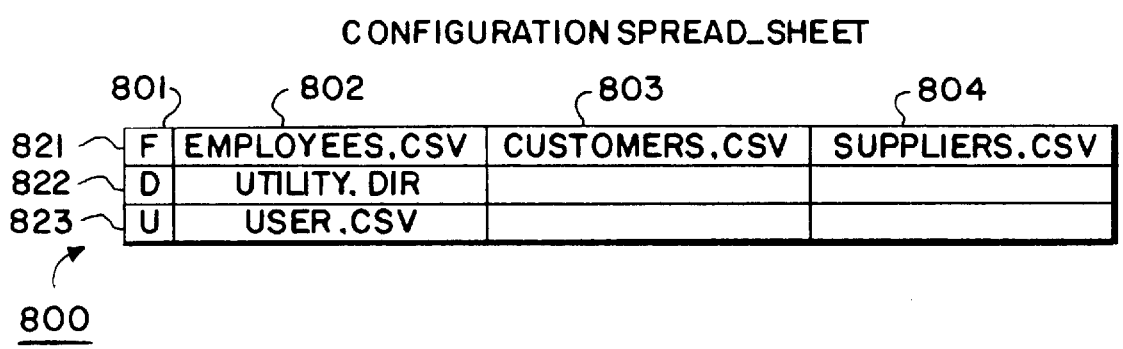
FIG. 9 is a block diagram of a configuration spread-sheet.

FIG. 9 shows a spread-sheet 800 including information describing how a particular database should be configured. More particularly, the information details the files and directories used during database creation. The syntax of file and directory names can be made compatible with the naming conventions of the computer system 10. The configuration information can be maintained as a CSV file named, for example, CONFIG.CSV.

If a row lists CLASS.CSV files, the first column 801 is, for example the letter F. The remaining columns 802–804 list the names of the included files. For example, the F-row 821 in FIG. 9 indicates that the database is to be created from class files EMPLOYEES.CSV, CUSTOMERS.CSV, and SUPPLIERS.CSV. The CONFIGURATION FILE 800 can include multiple F-rows, and each F-row can include multiple columns for specifying files.

Any files generated while the database is created are stored in a directory which is named on a row having the letter D in the first columns. In the example of FIG. 9, the directory UTILITY.DIR will be the destination directory. The letter U is used for rows which hold the names of USER.CSV files as described with reference to FIG. 7.

Figure 10:
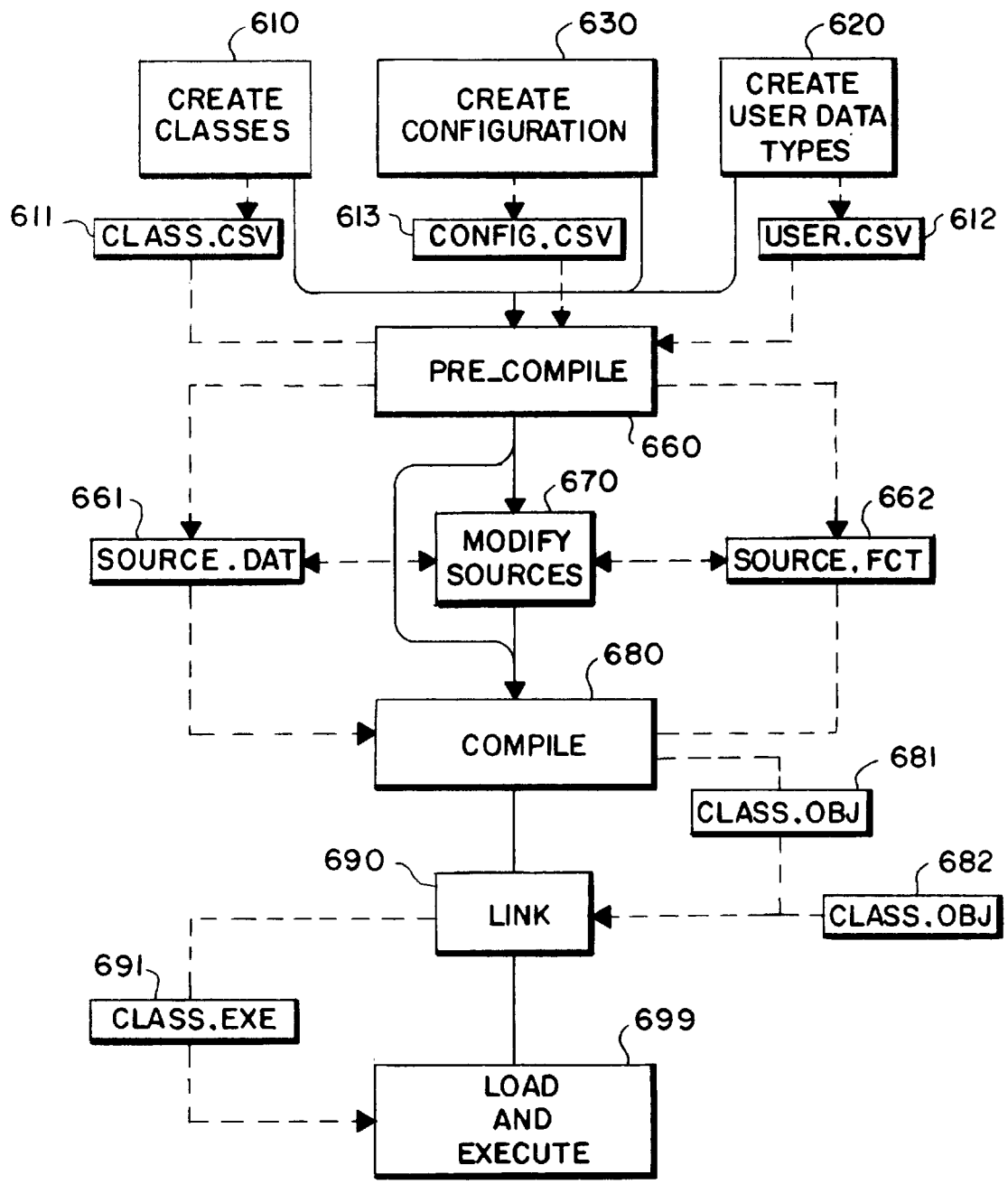
FIG. 10 is a flow diagram of a method for creating the database according to the principles of the invention.

Now, with reference to FIG. 10, a preferred method for creating an object-oriented database from these relational data structures is described.

In step 610, the data of the database is partitioned into a plurality of classes. Furthermore, each class is partitioned into members, each member including data with similar attributes. The class and members are defined in, for example, CLASS.CSV files 611.

The class definitions being in the general form as was described with reference to FIGS. 5 and 6. At least one member of a class is defined to be accessible by a key, preferably a primary key. The primary key values of the associated data objects being unique for each data object of the class. Furthermore, the definition includes relationships between associated classes.

In step 620, any optional user defined data types are created in USER.CSV files 612 as was described with reference to FIG. 7.

In step 630, the configuration file CONFIG.CSV 613 is created as was described with reference to FIG. 9.

In step 660, the files created in steps 610, 620, and as specified in step 630 are processed by a pre-compiler. The specific details of the pre-compiler are described with reference to FIGS. 11. Briefly, the pre-compiler translates the input files into source files compatible with a target programming language. In the preferred embodiment of the invention, the target programming language is an object-oriented language, for example C++. Therefore, the output of step 660 are C++ source files.

In general, there are two types of source files produced by the compiler. The first type of source file (SOURCE.DAT 661) generally includes C++ definitions which implement the data structures as specified in the input CLASS.CSV 611 and USER.CSV 612 files. Any data included as D-rows in the CLASS.CSV files 611 are also defined in SOURCE.DAT 661.

The second type of source file (SOURCE.FCT) includes the processes or functions for manipulating the data structures of the first type of source file. The processes created, in part, from the information contained on the C-, M-, A, T-, and S-rows of the CLASS.CSV files 611.

In an optional step 670, the source files 661 and 662 produced in step 660 maybe modified by an editor application. The source files can be annotated, enhanced, or otherwise edited to suit the needs of the user.

In step 680, the source files SOURCE.DAT 661 and SOURCE.FCT 662 are compiled into an object file CLASS.OBJ 681 by a C++ compiler.

In step 690, the object file CLASS.OBJ 681 can be linked with other previously produced object files such as CLASS.OBJ 682 to produce an executable file DATABASE.EXE 691.

In step 699, the executable file DATABASE.EXE 691 is loaded into the RAM 30 of FIG. 2 for executing. The executing of the file DATABASE.EXE being equivalent to running the database.

Figure 11:
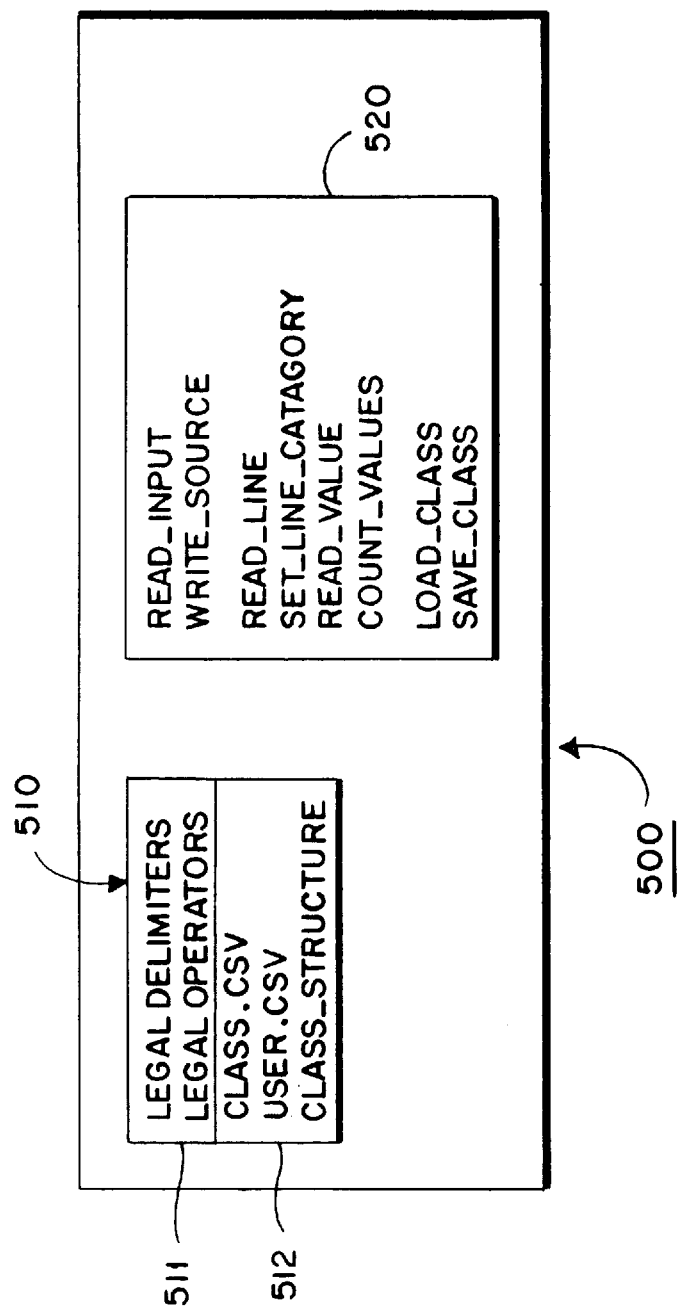
FIG. 11 is a block diagram of a pre-compiler used by the method of FIG. 10.

The structure of a pre-compiler 500 is shown in FIG. 11. In the preferred embodiment of the invention, the pre-compiler 500 is a C++ object. The pre-compiler 500 includes pre-compiler data structures 510 and pre-compiler methods or functions 520. The pre-compiler data structures 510 include persistent (permanent) data 511, and non-persistent (temporary) data 512.

The persistent pre-compiler data 511 include the delimiters used in the CSV files, for example comma, and end-of-line. Also included as part of the pre-compiler persistent data are the allowable logical operators permitted in a query expression, for example greater than, equal to, etc. Non-persistent data 512, with respect to the pre-compiler 500 include the input .CSV files named in the configuration file 800.

While the input CLASS.CSV and USER.CSV are pre-compiled, the non-persistent data 512 also includes a data structure named CLASS_STRUCTURE. Initially, the CLASS_STRUCTURE is maintained in relational form. The CLASS_STRUCTURE includes information necessary to create an object corresponding to the data and processing information of the class. The CLASS_STRUCTURE which is used to generate the actual source code for SOURCE.DAT and SOURCE.FCT is described below.

The pre-compiler methods 520 include a function for reading the input files, READ_INPUT, and a function for writing the output files, WRITE_SOURCE. The function READ_INPUT is used to read the CLASS.CSV and USER.CSV files. The function WRITE_SOURCE is used to write the lines of the output SOURCE.DAT and SOURCE.FCT during pre-compilation.

The functions READ_LINE, SET_LINE_CATEGORY, READ_VALUE, and COUNT-VALUES process the lines and values of the input CLASS.CSV and USER.CSV files. The lines corresponding to the rows of spread-sheets as defined above. The comma-separated-values corresponding to the columns of the spread-sheets.

Each line of a particular CSV file to be processed during pre-compilation is read in turn, by READ-LINE. The line is categorized by SET_LINE_CATEGORY according to the first value of the line as defined above.

After the line has been categorized, the functions READ_VALUE, COUNT_VALUES, and MAKE_STRUCTURE are used to take the subsequent values of the line and create the corresponding data structures and source code lines for the files SOURCE.DAT and SOURCE.FCT. The source code, of course, specifically tailored for a particular category of line.

The functions LOAD_CLASS and SAVE_CLASS are used to load and save a CLASS_STRUCTURE for a class being pre-compiled. In other words, once a class object is created, the object can be modified by a partial CLASS.CSV file, the partial CLASS.CSV file only containing lines specifying what the modification entails. The CLASS_STRUCTURE can be permanently retained on the DISK 40.

Figure 12:
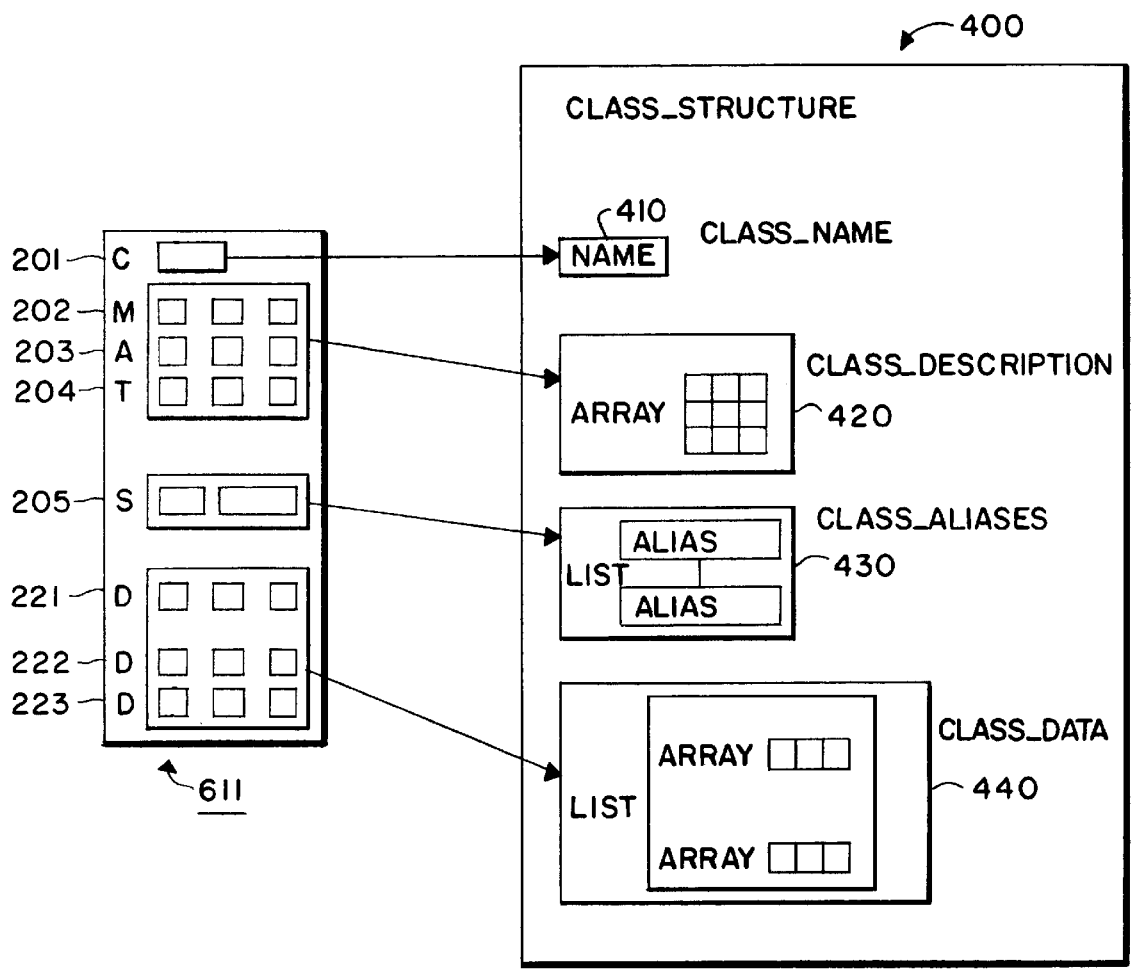
FIG. 12 is a block diagram of a class data structure generated by the pre-compiler of FIG. 11.

FIG. 12 shows how the pre-compiler 500 of FIG. 11 maps the input file CLASS.CSV 611 maps into a CLASS_STRUCTURE 400. The pre-compiler 500, while parsing the C-row 201 places the class name in a data structure CLASS_NAME 410. The M-, A-, and T-, rows 202–204 are placed in a data structures CLASS_DESCRIPTION 420 organized as an array. If the CLASS.CSV file 611 includes an optional query row 205, the aliases for the query expressions are placed in a data structure CLASS_ALIASES 430 organized as a list. The D-rows 221–223 are placed in a data structures CLASS_DATA 440. CLASS_DATA 440 is organized as a single one-dimensional array for each of the data rows.

As CLASS_STRUCTURE is created, appropriate C++ source code for the data definitions and functions corresponding to CLASS_STRUCTURE are written to the pre-compiler output source files. The functions for manipulating the defined data, depend in part, on the accessing methods to be used, as defined in M-rows, and the type of data as defined in T-rows.

For example, members of a class defined as being of the data type INTEGER, and accessing method HPKEY, will have the member data inserted as integer values into a table accessible by a hashing function. Similarly, functions for performing any query searches can likewise be created. The functions, in combination with the underlying data structures, constitute the objects of the database.

After the executable files have been loaded into the RAM 30 of FIG. 2, by the step "load and execute" step 699 of FIG. 10, new data can be accepted into the database, and old or existing data can be modified. As previously described, data can be loaded from CSV files including nothing but D-rows or data objects.

According to the preferred embodiment of the invention, the data structures, such as lists, arrays, and pointers, for accessing the data of the database, are dynamically maintained while loading and using the database. For example, when new data objects are accepted by the database, the addresses used for accessing the data are inserted into the corresponding pointer, list or array.

In other words, the memory addresses of data objects related to data objects of associated classes are dynamically maintained whenever new data are added to the database, or when old data are modified or deleted. The updating of memory pointer information is done by scanning all class T-rows. If any class includes a member using the pointer, list, or array accessing methods, the memory location of the referenced objects are maintained on-the-fly. This ensures that any subsequent access to related objects can be serviced in the bare minimum amount of time leading to a very high performance database with real-time responsiveness.

Although the foregoing has described preferred embodiments of the invention, those skilled in the art will recognize that changes to these embodiments can be made without departing from the principles of the invention, the scope of which are defined in the appended claims.

We claim:

1. A method for translating a relational database to an object-oriented database, comprising:

storing a plurality of data objects in a memory, each data object having attributes including a key value and a data value;

partitioning the data objects into a plurality of classes, each class having one or more members, each member including data objects having the same attributes;

organizing each of the plurality of classes into a relational table, each column corresponding to a grouping of data objects having the same attributes, and each row corresponding to one member of the class, said relational table having at least one definition row giving a definition of said designated class, said relational table having an indicator to indicate that a designated row contains data objects or that said designated row contains a definition of a class;

defining, for at least one member of a specific class, an access method to access the data objects of the specific class by key values;

defining, for another member of the specific class, an access method to access the data objects of a related class;

comparing a specific data value of a specific data object with the key values of the data objects of the related class;

associating, in response to the specific data value being equal to the key value of a related data object of the related class, a memory address of the related data object with the specific data value to enable direct access to the related data object while accessing the specific data object;

pre-compiling the relational tables into source files of an object-oriented language;

compiling the source files into object files;

linking the object files into an executable file; and loading and executing the executable file to create the object-oriented database, said definition rows of said relational tables controlling said object-oriented database to have said plurality of classes.

2. The method as in claim 1 including assigning a data type to each member, the data type for storing the data objects according to a predetermined physical data structure.

3. The method as in claim 1 where each member includes a member name for referencing the member.

4. The method as in claim 1 wherein said comparing step is performed whenever the specific data object is referenced.

5. The method as in claim 1 wherein the access method includes linearly searching the key values.

6. The method as in claim 1 including categorizing each row of the relationship table in a prepended column, the particular row categorized as a method row if the data object of the row defines the access method for accessing the data objects of the class.

7. A method for creating an object-oriented database, comprising:

storing a plurality of data objects in a memory, each data object having attributes including a key value and a data value;

partitioning the data objects into a plurality of classes, each class having one or more members, each member including data objects having the same attributes;

organizing each of the plurality of classes into a relational table, each relational table rows and columns, each column corresponding to a grouping of data objects having the same attributes, and each row corresponding to one member of the class, said relational table having at least one definition row giving a definition of said designated class, said relational table having an indicator to indicate that a designated row contains data objects or that said designated row contains a definition of a class;

defining, for at least one member of a specific class, a first access method to access the data objects of the specific class by key values;

defining, for another member of the specific class, a second access method to access the data objects of a related class;

comparing a specific data value of a specific data object with the key values of the data objects of the related class;

associating, in response to the specific data value being equal to the key value of related data object of the related class, a plurality of memory addresses of the related data object with the specific data value to enable direct access to the related data objects while accessing the specific data object;

pre-compiling the relational tables into source files of an object-oriented language;

compiling the source files into object files;

linking the object files into an executable file; and loading and executing the executable file to create the object-oriented database, said definition rows of said relational tables controlling said object-oriented database to have said plurality of classes.

8. The method as in claim 7 wherein the comparing is a logical comparing using logical operators, and associating the plurality of memory addresses if the logical comparing generates a true logical value.

9. The method as in claim 8 wherein the logical operators include greater than, less than, equal to, not equal to, and combinations of the logical operators in logical expressions.

10. The method as in claim 7 including organizing the plurality of memory addresses as an array of memory address.

11. A method for creating an object-oriented database, comprising:

storing a plurality of data objects in a memory, each data object having attributes including a key value and a data value;

partitioning the data objects into a plurality of classes, each class having one or more members, each member including the same attributes of the data objects;

defining, for at least one member of a specific class, an access method to access the data objects of the specific class by key values;

defining, for another member of the specific class, an access method to access the data objects of a related class;

comparing a specific data value of a specific data object with the key values of the data objects of the related class;

associating, in response to the specific data value being equal to the key value of a related data object of the related class, a memory address of the related data object with the specific data value to enable direct access to the related data object while accessing the specific data object;

organizing the data objects of each of the classes into a relational table, each relational table having rows and columns, said relational table having at least one definition row giving a definition of said designated class, said relational table having an indicator to indicate that a designated row contains data objects or that said designated row contains a definition of a class; and converting the relational tables into a high-level object-oriented source language, said definition rows of said relational tables controlling said object-oriented database to have said plurality of classes.

12. The method as in claim 11 wherein the source language is C++, and converting the source language to an executable file to run the object oriented database.

13. A method for translating a relational database to an object-oriented database, comprising:

storing a plurality of data objects in a relational database, said relational database stored in a computer memory, each data object having attributes including a key value and a data value, said data objects searchable by said key value in said relational database;

partitioning said data objects into a plurality of classes;

organizing each of said plurality of classes into a relational table, each said relational table corresponding to a designated class, columns of said relational table having an attribute of said data objects, a row of said relational table having one member of said designated class, said relational table having at least one definition row giving a definition of said designated class, said relational table having an indicator to indicate that a designated row contains data objects or that said designated row contains a definition of a class; and, generating an executable file of an object-oriented language from said relational tables, said executable file capable of generating said object-oriented database, said definition rows of said relational tables controlling said object-oriented database to have said plurality of classes.

14. The method of claim 13 further comprising: said at least one definition row has names of attributes of said data objects.

15. The method of claim 13 further comprising: said at least one definition row has designations of methods of accessing said data objects.

16. The method of claim 13 further comprising: said at least one definition row has designations of types of data stored in said data objects.

17. The method of claim 13 further comprising: said at least one definition row has names of queries, said queries accessible through said names.

18. The method of claim 13 wherein said indicator further comprises:
   a column in said relational table, said column having definition indicator for said at least one definition row, and said column having a data indicator for a row containing a data object.

19. A method for translating a relational database to an object-oriented database, comprising:

storing a plurality of data objects in a relational database, said relational database stored in a computer memory, each data object having attributes including a key value and a data value, said data objects searchable by said key value in said relational database;

partitioning said data objects into a plurality of classes;

organizing each of said plurality of classes into at least one relational table, columns of said at least one relational table having an attribute of said data objects, a row of said at least one relational table having one member, said member selected from selected attributes of one of said data objects, said at least one relational table having at least one processing row, said processing row containing processing information to control generation of said object-oriented database, said at least one relational table having an indicator to indicate that a designated row contains a member or that said designated row is a processing row;

generating an executable file of an object-oriented language from said relational tables, said executable file capable of generating said object-oriented database; and, controlling said generating an executable file, in response to said indicator, to have processing information in said at least one processing row of said relational table control said object-oriented database to have a structure specified by said processing information.

20. The method as in claim 19 wherein said processing information further comprises a name of a designated class, said designated class associated with members stored in said at least one relational table.

21. The method as in claim 19 wherein said processing information further comprises names of attributes of members of a class.

22. The method as in claim 19 wherein said structure further comprises accessing methods for accessing data of said data objects.

23. The method as in claim 19 wherein said structure further comprises a type of attributes of said members.

24. The method as in claim 23 wherein said type further comprises integer.

25. The method as in claim 23 wherein said type further comprises string.

26. The method as in claim 23 wherein said type further comprises floating.

27. The method as in claim 23 wherein said type further comprises real.

28. The method as in claim 23 wherein said type further comprises long-string.

29. The method as in claim 23 wherein said type further comprises canonical.

30. The method as in claim 23 wherein said type further comprises hexadecimal.

31. The method as in claim 23 wherein said type further comprises a class name.

32. The method as in claim 23 wherein said type further comprises a user defined data type.

33. The method as in claim 23 wherein said type further comprises an enumerate type.

34. The method as in claim 23 wherein said type further comprises a list type.

35. The method as in claim 23 wherein said type further comprises names of queries.

36. The method as in claim 23 wherein said type further comprises a query written in SQL query language.

37. The method as in claim 19 wherein said processing information further comprises a specification of methods of accessing said data in said object-oriented database.

38. The method as in claim 19 wherein said processing information further comprises a method of accessing data objects related to a class.

39. The method as in claim 19 wherein said processing information further comprises a method of accessing data objects using a primary key.

40. The method as in claim 19 wherein said processing information further comprises a method of accessing data objects using a secondary key.

41. The method as in claim 19 wherein said processing information further comprises a method of accessing data objects using a pointer.

42. The method as in claim 19 wherein said processing information further comprises a method of accessing data objects using an array.

43. The method as in claim 19 wherein said processing information further comprises a method of accessing data objects using a list.

44. The method as in claim 19 wherein said processing information further comprises a method of accessing data objects using a linked list.

45. The method as in claim 19 wherein said processing information further comprises a method of accessing data objects using a hashing table.

46. The method as in claim 19 wherein said processing information further comprises a method of accessing data objects using a B-tree.

* * * * *